United States Patent [19]

Ogasawara

[11] 4,451,780
[45] May 29, 1984

[54] NON-CONTACT TYPE MICRODISPLACEMENT METER

[76] Inventor: Hiroomi Ogasawara, 3821-4, Yamakita, Yamakitamachi, Ashigarakami-gun, Kanagawa-ken, Japan

[21] Appl. No.: 304,415

[22] Filed: Sep. 21, 1981

[30] Foreign Application Priority Data

Sep. 26, 1980 [JP] Japan ................ 55-134029

[51] Int. Cl.³ ............................ G01R 27/26
[52] U.S. Cl. ................... 324/61 R; 324/61 P
[58] Field of Search ............. 324/61 R, 61 P

[56] References Cited

U.S. PATENT DOCUMENTS

| 3,046,479 | 7/1962 | Mead et al. | 324/61 R |
|---|---|---|---|
| 3,221,256 | 11/1965 | Walden. | |
| 3,764,899 | 10/1973 | Peterson et al. | 324/61 R |
| 4,025,846 | 5/1977 | Franz et al. | 324/61 P |
| 4,112,355 | 9/1978 | Gibson, Jr. et al. | 324/61 R X |
| 4,227,182 | 10/1980 | Ogasawara et al. | 324/61 R X |
| 4,238,782 | 12/1980 | Ogasawara | 324/61 R X |
| 4,297,634 | 10/1981 | Ogasawara et al. | 324/61 P |
| 4,300,093 | 11/1981 | Ogasawara et al. | 324/61 R |
| 4,301,401 | 11/1981 | Roof et al. | 324/61 R |
| 4,347,478 | 8/1982 | Heerens et al. | 324/61 P X |

FOREIGN PATENT DOCUMENTS 56-141512 11/1981 Japan.
213787 6/1967 Sweden.

*Primary Examiner*—Stanley T. Krawczewicz
*Attorney, Agent, or Firm*—Beveridge, DeGrandi & Kline

[57] ABSTRACT

In a non-contact type microdisplacement meter, two electrodes different in area are confronted with an object under measurement to form two electrostatic capacitances between the object and the electrodes, and the capacitances are coupled to two oscillator circuits, so that a displacement signal is provided as the frequency difference between the oscillator circuit, thereby to measure the very small displacement of the object.

9 Claims, 19 Drawing Figures

NON-CONTACT TYPE MICRODISPLACEMENT METER

BACKGROUND OF THE INVENTION

This invention relates to a non-contact type microdisplacement meter.

Microdisplacement measurement is employed as means essential for explicating various phenomena, for industrially utilizing such phenomena and for automation of various devices therefor. In the application of the microdisplacement measurement, a non-contact type measurement is required because it is not desirable that an object under measurement be locally deformed by measurement pressure, or because an object under measurement is continuously turned.

Eddy current type displacement meters, optical displacement meters, and electrostatic capacitance type displacement meters are well known non-contact type microdisplacement meters. In such conventional meters of the electrostatic capacitance type, the electrode is confronted with an object under measurement, and a very small displacement of the object is detected by utilization of an electrostatic capacitance variation due to the surface variation of the object. The electrostatic capacitance variation is converted into a frequency variation by an oscillator circuit, and this frequency variation is further converted into a voltage variation. In another example, the electrostatic capacitance is measured as an impedance component by a bridge circuit.

In either case, the voltage variation is in non-linear relation to the displacement, and therefore it is necessary to use a linearizor for linearization.

However, the conventional electrostatic capacitance type displacement meter is intricate in arrangement. That is, the displacement meter depends greatly on the linearizing function of the linearizor. Accordingly, the linearizor must have an extremely high performance. The necessity of such a high performance linearizor not only lowers the stability of the displacement meter but also increases the manufacturing cost.

SUMMARY OF THE INVENTION

Accordingly, an object of this invention is to provide a non-contact type microdisplacement meter in which the above-described difficulties accompanying a conventional displacement meter have been eliminated.

The foregoing object and other objects of the invention have been achieved by the provision of a non-contact type microdisplacement meter which, according to the invention, comprises: a main electrode and an auxiliary electrode which are different in area from each other and which are disposed to confront an object under measurement, so that two electrostatic capacitances are formed between the object and the main and auxiliary electrodes, respectively; two oscillator circuits coupled to the two electrostatic capacitances to provide signals whose frequencies change with the electrostatic capacitances, respectively; a mixer for receiving output frequency signals from the oscillator circuits, to provide a signal having a frequency which represents the difference between the output frequency signals; and a circuit for converting the output signal of the mixer into a desired type signal.

The nature, principle and utility of the invention will become more apparent from the following detailed description when read in conjunction with the accompanying drawings.

BRIEF DESCRIPTION OF THE DRAWINGS

In the accompanying drawings

DETAILED DESCRIPTION OF THE INVENTION

Figure 1:
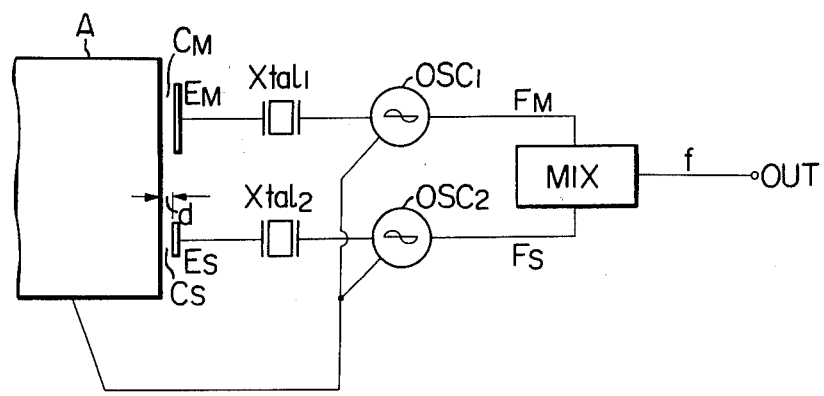
FIG. 1 is an explanatory diagram showing the arrangement of one example of a non-contact type microdisplacement meter according to this invention.

FIG. 1 shows the arrangement of a first example of a non-contact type microdisplacement meter according to this invention.

As shown in FIG. 1, a main electrode $E_M$ and an auxiliary electrode $E_S$ are set in front of the surface of an object A whose displacement should be measured. The ratio of the area of the main electrode $E_M$ to the area of the auxiliary electrode $E_S$ is N:1. More specifically, these electrodes are so set that, when the object A is at rest, both of the electrodes are spaced a distance d from the surface of the object A under measurement. Therefore, when the object A is at rest, the electrostatic capacitance $C_M$ between the object A and the main electrode $E_M$ is N times the electrostatic capacitance $C_S$ between the object A and the auxiliary electrode $E_S$. The capacitances $C_M$ and $C_S$ are connected in series to oscillators $OSC_1$ and $OSC_2$ respectively through crystal oscillator units $Xtal_1$ and $Xtal_2$, respectively. Therefore, the oscillators $OSC_1$ and $OSC_2$ from signals $F_M$ and $F_S$ having frequencies which are defined by the crystal oscillator units $Xtal_1$ and $Xtal_2$ and the electrostatic capacitances $C_M$ and $C_S$, respectively. These signals $F_M$ and $F_S$ are applied to a mixer MIX, where they are mixed, as a result of which a signal f having a frequency between the frequencies of the signals $F_S$ and $F_M$ is provided at an output terminal OUT.

Figure 2A:
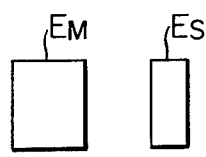
FIGS. 2(a) through 2(d) are explanatory diagrams showing various examples of electrodes which can be employed in the meter of the invention.
Figure 2B:
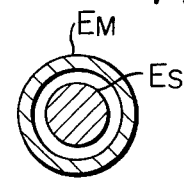
Figure 2C:
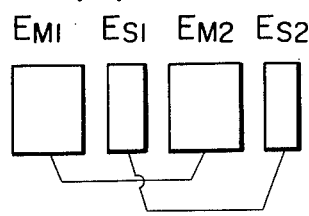
Figure 2D:
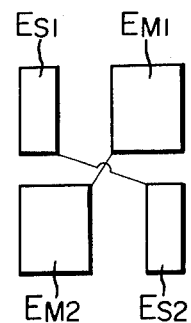

FIGS. 2(a) through 2(d) show modifications of the main electrode $E_M$ and the auxiliary electrode $E_S$. In the case of FIG. 2(a) one main electrode $E_M$ and one auxiliary electrode $E_S$ are employed, and both of the electrodes are rectangular. FIG. 2(b) shows one annular main electrode and one circular auxiliary electrode. In the case of FIG. 2(c), two rectangular main electrodes and two rectangular auxiliary electrodes are arranged alternately. In the case of the part (d), two rectangular main electrodes and two rectangular auxiliary electrodes are arranged diagonally. It goes without saying that the modifications of the electrodes are not limited to those shown in FIGS. 2(a) through 2(d)

Figure 3A:
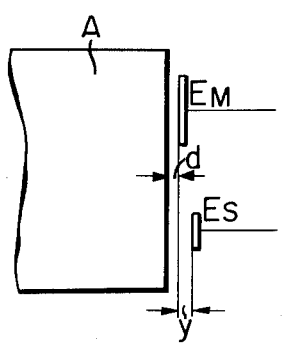
FIGS. 3(a), 3(b) and 3(c) are side views showing various examples of the arrangement of the electrodes in the invention.
Figure 3B:
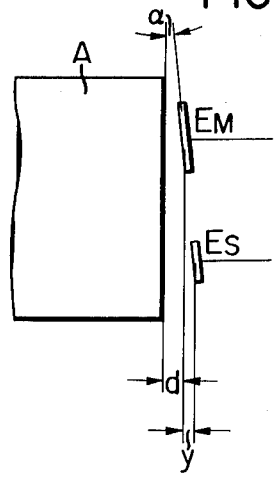
Figure 3C:
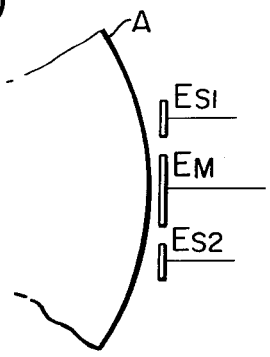

FIGS. 3(a), 3(b) and (c) show other examples of the arrangement of the main and auxiliary electrodes. In the case of FIG. 3(a) the main electrode $E_M$ is spaced by a distance d from the object A, while the auxiliary electrode $E_S$ is spaced by a distance y from the main electrodes. The electrodes are in parallel with the object's surface under measurement. In the case of FIG. 3(b) both of the electrodes are arranged to form an angle $\alpha$ with the object's surface, with the auxiliary electrode being further from the surface than is the main electrode. In this case, the operation is the same as that in the case of the part (a). FIG. 3(c) shows the case where the object's surface is cylindrical or spherical. In this case, a main electrode $E_M$ and two auxiliary electrodes $E_{S1}$ and $E_{S2}$ are arranged in one plane. Similarly as in the cases of FIGS. 3(a) and 3(b), the auxiliary electrodes are further from the object's surface than the main electrode. It goes without saying that, in the case where the object's surface under measurement is not flat, the auxiliary electrode may be shifted with respect to the main electrode similarly as in the case of FIG. 3(a).

Figure 4:
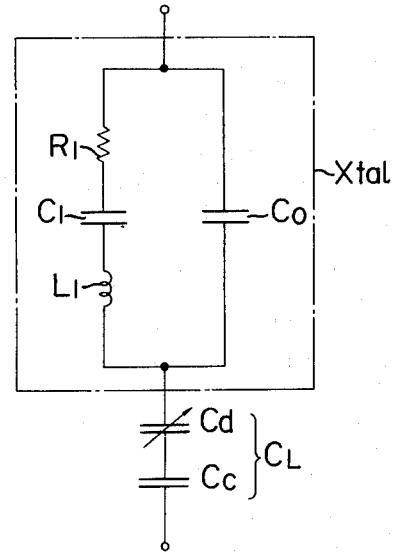
FIG. 4 is an equivalent circuit diagram showing the connection of a crystal oscillator unit to electrostatic capacitances formed by the electrodes in the example of the meter shown in FIG. 1.

FIG. 4 is an equivalent circuit which represents the crystal oscillator unit, which is a frequency determining element in the microdisplacement meter of the invention providing a frequency output, and the electrostatic capacitance between the main electrode or the auxiliary electrode and the object under measurement. The electrostatic capacitance Cd between the electrode and the object, and the electrostatic capacitance Cc which is a circuit constant of the oscillator are connected to the crystal oscillator unit Xtal in FIG. 4. In general, a crystal oscillator unit Xtal is represented by a circuit which is obtained by connecting the electrostatic capacitance $C_0$ in parallel to a series circuit of the resistance $R_1$, the electrostatic capacitance $C_1$ and the inductance $L_1$. The capacitance Cc connected to the crystal oscillator unit Xtal is much larger than the capacitance Cd (Cc>>Cd), and it can be considered that the composite capacitance $C_L$ of these capacitances Cc and Cd is substantially equal to the capacitance Cd.

The frequency determining equation of the circuit in FIG. 4 is as follows:

$$F = F_O\left(1 + \frac{C_1}{C_0 + C_L}\right)^{\frac{1}{2}} \quad (1)$$

However, since $C_L = Cd$, the equation (1) can be rewritten as follows:

$$F = F_O\left(1 + \frac{C_1}{C_0 + Cd}\right)^{\frac{1}{2}} \quad (2)$$

$$= F_O\left(1 + \frac{1}{C_0/C_1 + Cd/C_1}\right)^{\frac{1}{2}}$$

If $C_0/C_1 = 250$ and $C_0 = 2.5$ (pF), which are generally employed as the constants of a crystal oscillator unit, are inserted into the equation (2), then $C_1 = 0.01$ (pF) and $$F = F_O\left(1 + \frac{1}{250 + 100\,Cd}\right)^{\frac{1}{2}} \quad (3)$$

where $$Cd = \frac{A(mm^2)\epsilon_O}{d(mm)} \times 10^{-3} \text{ (pF)}$$

with $\epsilon_O = 8.854$

Therefore, the equation (3) can be rewritten into the following expression (4):

$$F = F_O\left(1 + \frac{1}{250 + 100 \times A\epsilon_O \times \epsilon_S/d \times 10^3}\right)^{\frac{1}{2}} \quad (4)$$

$$= F_O\left(1 + \frac{1}{250 + 88.54 A/d}\right)^{\frac{1}{2}}$$

If F=20 (MHz) and the areas of the main and auxiliary electrodes are 150 (mm²) and 50 (mm²) respectively, then the oscillator output frequency $F_M$ provided through the main electrode and the oscillator output frequency $F_S$ provided through the auxiliary electrode are:

$$F_M = 20 \times 10^6\left(1 + \frac{1}{250 \times 88.54 \times 150/d}\right)^{\frac{1}{2}} \quad (5)$$

$$F_S = 20 \times 10^6\left(1 + \frac{1}{250 \times 88.54 \times 50/d}\right)^{\frac{1}{2}} \quad (6)$$

The oscillator output frequency $F_S'$ which is obtained in the case where the auxiliary electrode is shifted by the distance y from the main electrode as shown in the FIG. 3(a), is:

$$F_S' = 20 \times 10^6\left(1 + \frac{1}{250 \times 88.54 \times 50/(d + y)}\right)^{\frac{1}{2}} \quad (7)$$

Figure 5A:
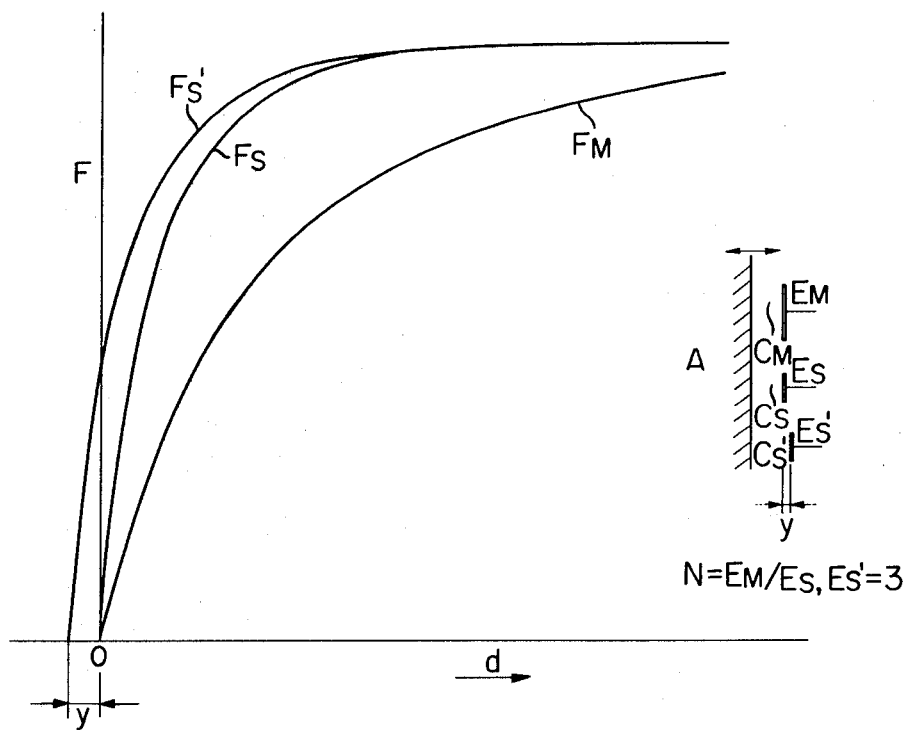
FIGS. 5(a) and 5(b) are graphical representations indicating the operating characteristics of the meter according to the invention.
Figure 5B:
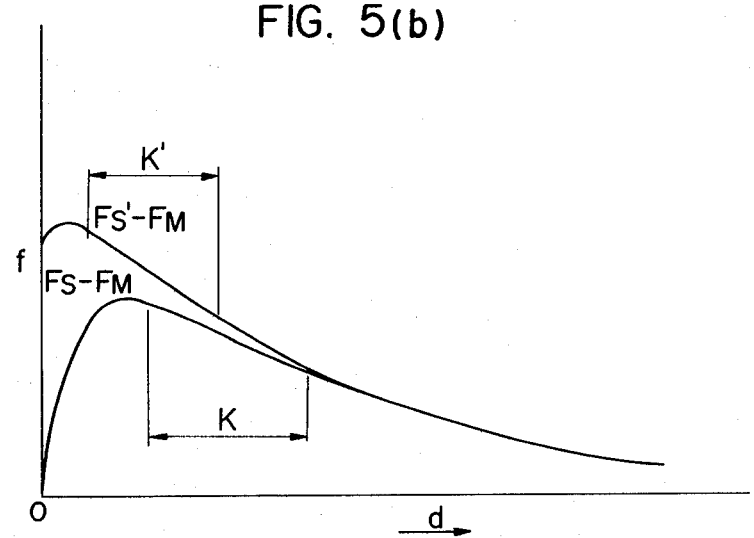

FIGS. 5(a) and 5(b) show operating characteristics of the microdisplacement meter according to the invention. In this case, the main electrode $E_M$ and the first auxiliary electrode $E_S$ are arranged in the same plane, and the second auxiliary electrode $E_S'$ is stepped back by a distance y from the first auxiliary electrode $E_S$. The three electrodes $E_M$, $E_S$ and $E_S'$ are arranged in parallel with the measurement surface of an object A under measurement. The ratio of the area of each of the auxiliary electrodes $E_S$ and $E_S'$ to the area of the main electrode $E_M$ is $\frac{1}{3}$. When the displacement of the object A is measured with the electrodes $E_M$, $E_S$ and $E_S'$ connected to the same oscillator, the output signal frequencies $F_M$, $F_S$ and $F_S'$ from the oscillator are different as shown in FIG. 5(a). In other words, the relation between the main electrode $E_M$ and the first auxiliary electrode $E_S$ is given by the relation between equations (5) and (6) above. On the other hand, for the second auxiliary electrode $E_S'$, the variation characteristics is shifted by y along the horizontal axis because the second auxiliary electrode is stepped back from the first auxiliary electrode $E_S$. Thus, the output signal frequency $F_S'$ is given by equation (7).

When the frequencies $F_M$ and $F_S$ thus obtained are mixed, and the frequencies $F_M$ and $F_S'$ are mixed, then beat frequencies f are obtained as shown in FIG. 5(b). The beat frequencies are the difference frequency $(F_S - F_M)$ between the frequency signal $F_S$ due to the first auxiliary electrode and the frequency signal $F_M$ due to the main electrode, and the difference frequency $(F_S' - F_M)$ between the frequency signal $F_S'$ due to the second auxiliary electrode and the frequency signal $F_M$ due to the main electrode. As the displacement is increased from zero, each of the beat frequencies increases to a maximum and then decreases gradually.

The characteristic curves indicating the variations of the beat frequencies have parts K and K', indicated in FIG. 5(b), which can be regarded as substantially linear. The presence of the linear parts K and K' makes it unnecessary to provide a linearizor in the invention.

In the case of the characteristic curve $(F_S - F_M)$ the beat frequency f changes moderately with displacement d. Therefore the characteristic curve is suitable for a wide range of displacement measurement. On the other hand, in the case of the characteristic curve $(F_S' - F_M)$, the beat frequency f changes relatively greatly with displacement d. Therefore, the characteristic curve is excellent in resolution. The more the auxiliary electrode is shifted from the main electrode, the steeper the characteristic curve becomes. Therefore, by suitably selecting the amount of shift (y), a desired resolution or displacement-frequency characteristic can be obtained. If, with respect to the amount of shift (y), the auxiliary electrode is set closer to the object than the main electrode is, then a gentle characteristic curve can be obtained. The characteristic curve may be changed by changing the ratio N of the main electrode area to the auxiliary electrode area.

Figure 6:
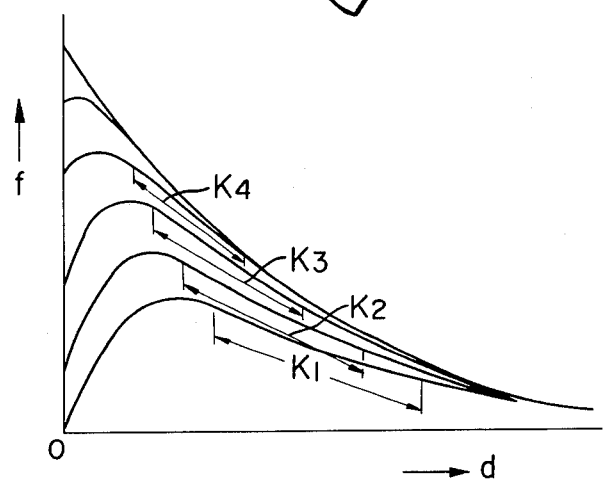
FIG. 6 is also a graphical representation showing how the operating characteristic can be changed as desired.

FIG. 6 is a graphical representation indicating the characteristic variations of the beat frequency f when the auxiliary electrode is variously shifted. In the case of the characteristic curve including a part $K_1$, the resolution is somewhat insufficient, but the range of measurement is largest. In the cases of the characteristic curves including parts $K_2$ and $K_3$, the resolution is improved, but the range of measurement is decreased. In the case of the characteristic curve including part $K_4$, the range of measurement is smallest, but the resolution is highest. The beat frequency signal may be processed as a digital signal, or may be utilized after being converted into an analog signal.

Figure 7:
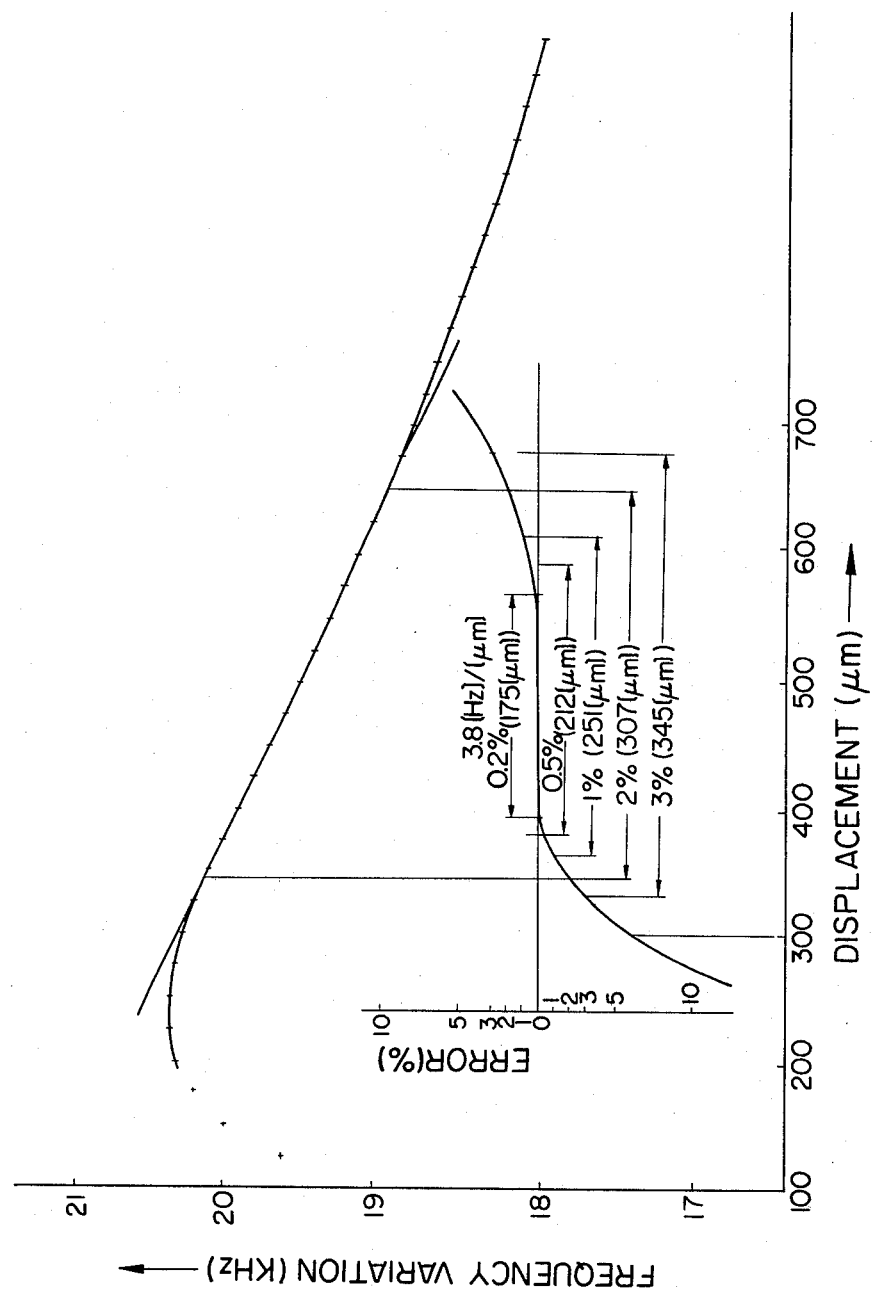
FIGS. 7 and 8 are graphical representation indicating the actual measurement characteristics of an experimental device according to the invention.
Figure 8:
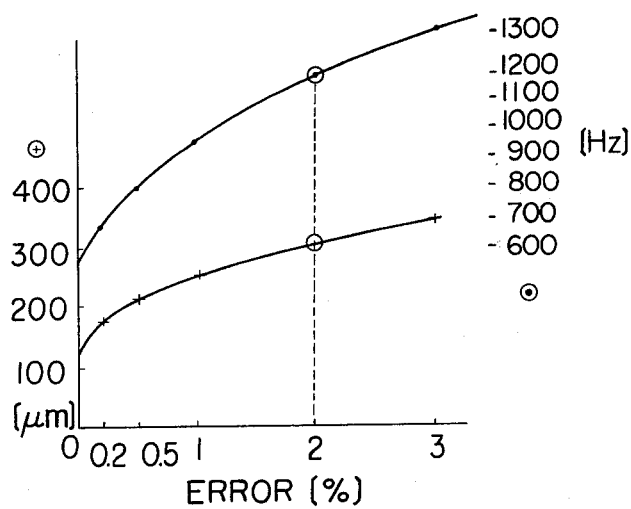

FIGS. 7 and 8 show actual measurement characteristics which were obtained with an experimental microdisplacement meter according to the invention. More specifically, FIG. 7 indicates a displacement ($\mu$m)-frequency variation (kHz) characteristic, and a displacement ($\mu$m)-error (%) characteristic, while FIG. 8 indicates an error (%)-displacement ($\mu$m) characteristic and an error (%)-frequency (Hz) characteristic. In this experimental device, the areas of the main electrode $E_M$ and the auxiliary electrode $E_S$ were $9.8 \times 21$ (mm$^2$) and $9.8 \times 6$ (cm$^2$) respectively, and these electrodes were arranged in the same plane (y=0(mm)). The two oscillator circuits were so arranged that, when the main and auxiliary electrodes were positioned at the standard positions, a beat frequency f of about 20 (kHz) was obtained.

According to the actual experiment, with a displacement of about 300 $\mu$m, the frequency variation was about 1.1 kHz and the error was about 2%. With 3% error, the frequency variation was 1319 Hz for a displacement of 347 $\mu$m. As the error was decreased, the displacement and the frequency variation were decreased. With 0.2% error, the frequency variation was 665 Hz for a displacement of 175 $\mu$m. These data are as indicated in FIG. 7 with displacements on the horizontal axis, and as indicated in FIG. 8 with errors on the horizontal axis.

Figure 9A:
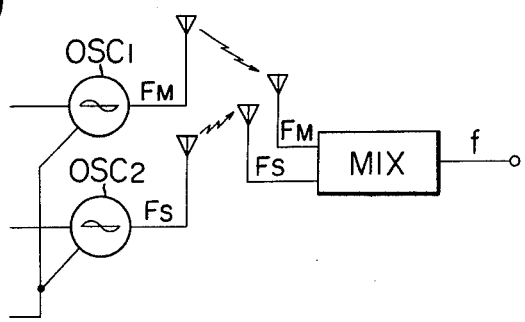
FIGS. 9(a) and 9(b) are diagrams outlining examples of a system for transmitting the output signal of the meter according to the invention.
Figure 9B:
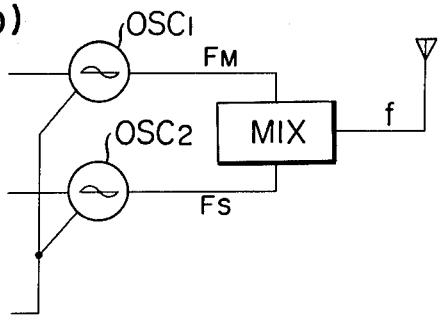

FIGS. 9(a) and 9(b) depict examples of a system for transmitting the output signal of the microdisplacement meter according to the invention. By radio transmission as depicted in FIG. 9(a), a so-called "telemetering" can be carried out. The radio transmission may be carried out by using the outputs of the oscillators $OSC_1$ and $OSC_2$ as shown in FIG. 9(a), or by using the output of the mixer MIX as shown in the part (b).

Figure 10A:
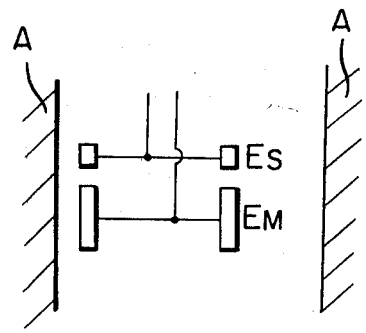
FIGS. 10(a), 10(b) and 10(c) are explanatory diagrams showing other examples of the meter according to the invention, which are employed to measure a hole diameter and the outside diameter of a cylindrical object.
Figure 10B:
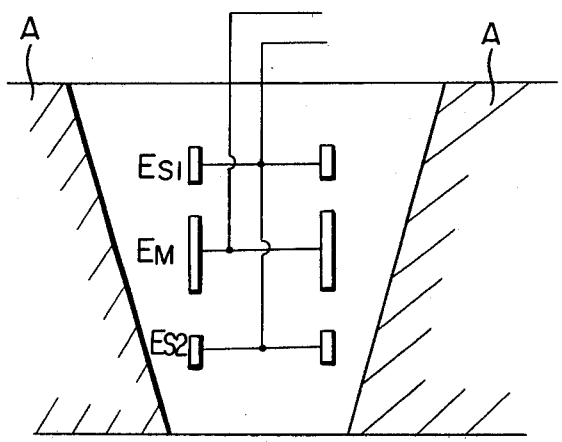
Figure 10C:
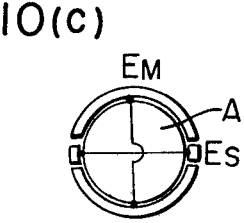

FIGS. 10(a), 10(b), and 10(c) show examples of the microdisplacement meter according to the invention, which are employed to measure the diameter of a hole and the outside diameter of a cylindrical object. More specifically, the example shown in FIG. 10(a) is to measure the diameter of a straight hole, and the example shown in FIG. 10(b) is to measure the size of a tapered hole. The example shown in FIG. 10(c) is to measure the outside diameter of a cylindrical object.

The technical concept in the case of FIG. 10(a) is similar to that in the case where the distance between an object A and the electrodes is measured as was described before. Therefore, the example shown in FIG. 10(b) for measuring the size of a tapered hole, will be described. In this case, as the measurement position is changed in the direction of depth of the hole, the diameter measured changes. The measurement position is at the center in a vertical direction of the main electrode. This will be applied to the case of the FIG. 1(a). Two auxiliary electrodes $E_{S1}$ and $E_{S2}$ are arranged symmetrical with respect to the main electrode $E_M$ and are identical in configuration. Therefore, the auxiliary electrodes are complementarily, so that a hole diameter at the level of the center of the main electrode can be measured.

These electrodes $E_M$, $E_{S1}$ and $E_{S2}$ are inserted into the hole. As the measurement is for the average distance between the object and the electrode, it is not always necessary to position the electrodes at the center of the hole. This is also true of the example shown in FIG. 10(c) which measures the outside diameter of a cylindrical object.

As is apparent from the above description, according to the invention two electrodes or two groups of electrodes different in area are confronted with an object under measurement so that two electrostatic capacitances are formed between the object and the electrodes, and the capacitances thus formed are combined with oscillator circuits, so as to provide a displacement signal as the difference in frequency between the oscillator circuits. Therefore, a signal is obtained whose frequency changes linearly with the displacement of the object. Thus, the microdisplacement meter of the invention, unlike conventional ones, can carry out non-contact type displacement detection without using a linearizor.

What is claimed is:

1. A non-contact type microdisplacement indicating circuit for determining the displacement of an object comprising:

a main electrode having an area $A_M$;
an auxiliary electrode having an area $A_S$;
means positioning said main electrode to confront the object at a distance $d_M$, to form therewith a first capacitor having a capacitance $C_M$, which is a function of $A_M$ and $d_M$, and positioning said auxiliary electrode to confront the object at a distance $d_S$, to form therewith a second capacitor having a capacitance $C_S$, which is a function of $A_S$ and $d_S$;
a first oscillator circuit having said first capacitor incorporated therein as a frequency varying component;
a second oscillator circuit having said first capacitor incorporated therein as a frequency varying component; and
a mixer coupled to said first and second oscillator circuits for providing a frequency difference signal determined by the difference in the frequencies of said first and second oscillator circuits.

2. A circuit as claimed in claim 1 in which said positioning means positions said electrodes so that $d_M = d_S$.

3. A circuit as claimed in claim 1 in which said positioning means positions said electrodes so that $d_M \neq d_S$.

4. A circuit as claimed in claim 3 in which $d_S$ is greater than $d_M$.

5. A circuit as claimed in claim 1 in which $A_M \neq A_S$.

6. A circuit as claimed in claim 5 in which $A_M$ is greater than $A_S$.

7. A circuit as claimed in claim 1 further comprising radio transmission means and radio reception means coupling said oscillator circuits to said mixer.

8. A circuit as claimed in claim 1 further comprising radio transmission means coupled to said mixer for transmitting the frequency difference signal to a radio receiver.

9. A circuit as claimed in claim 1 in which each of said oscillator circuits comprises a crystal oscillator circuit.

* * * * *